FIP8102 OR 3,566,235

+5264R X5308T

United States Patent

[11] 3,566,235

[72] Inventors Gary W. Rose
Brampton, Ontario, Canada;
Rollin A. Cooper, Los Angeles, Calif.

[21] Appl. No. 771,061
[22] Filed Oct. 28, 1968
[45] Patented Feb. 23, 1971
[73] Assignee The Garrett Corporation
Los Angeles, Calif.

[54] DUAL FREQUENCY MEANS FOR TRANSMITTING RADIO WAVES FROM A DAMAGED AIRCRAFT
8 Claims, 4 Drawing Figs.

[52] U.S. Cl. 325/115, 325/154, 325/156, 325/178, 343/705
[51] Int. Cl. H04b 1/02
[50] Field of Search 325/178, 179, 180, 112, 114, 117; 343/715, 793, 818, 846, 848; 343/705, 708, 711, 713; 325/154, 156, 111, 115

[56] References Cited

UNITED STATES PATENTS 2,452,073 10/1948 Shivley 343/705X
2,516,500 7/1950 Alford 343/705
3,040,315 6/1962 Kramer 325/158X
3,132,342 5/1964 Ford 343/705

FOREIGN PATENTS 476,926 12/1937 Great Britain 325/179

*Primary Examiner*—Robert L. Griffin
*Assistant Examiner*—Benedict V. Safourek
*Attorneys*—Edward B. Johnson, John N. Hazelwood, Albert T. Miller and Orville R. Seidner

ABSTRACT: In combination, a radio transmitter mounted on an aircraft wherein the antenna has the features of a center-fed balanced dipole antenna but is capable of operating effectively when one half thereof is broken off. The dipolelike antenna comprises two inline elements protruding from the vertical stabilizer of the aircraft in which position the probability of both elements breaking off during a crash landing is minimized. Circuit means are provided for feeding a radio frequency signal to each element of the novel antenna so that both signals have the same frequency and have their currents 180° out of phase.

INVENTORS.
GARY W. ROSE
ROLLIN A. COOPER
BY [signature]
ATTORNEY

INVENTORS.
GARY W. ROSE
ROLLIN A. COOPER
BY Dominick Nardelli
ATTORNEY

DUAL FREQUENCY MEANS FOR TRANSMITTING RADIO WAVES FROM A DAMAGED AIRCRAFT

This invention relates to means for locating aircraft that have been forced down and, more particularly, to a radio transmitter having more reliability and improved characteristics, especially, after an aircraft has crash landed.

The prior art suggests the use of a radio transmitter that is capable of being jettisoned from an aircraft whenever the aircraft makes a crash landing. This procedure requires means to insure that the transmitter is not broken when it hits the ground. Then, if the transmitter is capable of transmitting s radio signals, relatively large power requirements are needed since the antenna was designed to fit the available space and not for efficient operation.

Past experience has shown that when relatively lightweight aircraft crash, the probability of the vertical stabilizer being intact is relatively high. Therefore, the prior art teaches the mounting of an antenna arrangement on or near the vertical stabilizer but these antennas have been designed for reliability after crashing and not for radiating maximum radio energy over a relatively large solid angle. An example of an antenna for radiating maximum radio energy over a relatively large solid angle is a center-fed balanced dipole antenna, but, if one half of a center-fed dipole happens to be damaged during a crash landing, the remaining half becomes an inefficient antenna.

Therefore, an object of this invention is to provide an antenna on an aircraft to transmit emergency signals which antenna has the features of a center-fed dipole and which antenna is capable of radiating a significant fraction of the energy available from the transmitter if one half of the antenna is damaged.

Another object of this invention is to provide an improved, reliable self-sufficient radio transmitter capable of being self-energizing in a crash.

Another object of this invention is to provide a radio transmitter that is capable of transmitting two frequencies simultaneously.

Briefly, these objects are accomplished by a solid-state radio transmitter wherein the output is channeled through two circuits, one circuit having primarily inductive impedance and the other having primarily capacitive impedance. The output from each channel is fed to a respective one of two rod antennas that are disposed in a straight line with the ground plane disposed therebetween. The high frequency power, since it passes through the two different circuits, produces within the rods an instantaneous current travelling in the same direction, just as in a center-fed balanced dipole antenna. Since the two rod antennas are independent of each other, and, if one antenna happens to break during a crash landing, the other antenna would radiate a significant fraction of the power available.

These and other objects and features of advantages would become more apparent from the following description of the invention and the accompanying drawings, in which.

Figure 1:
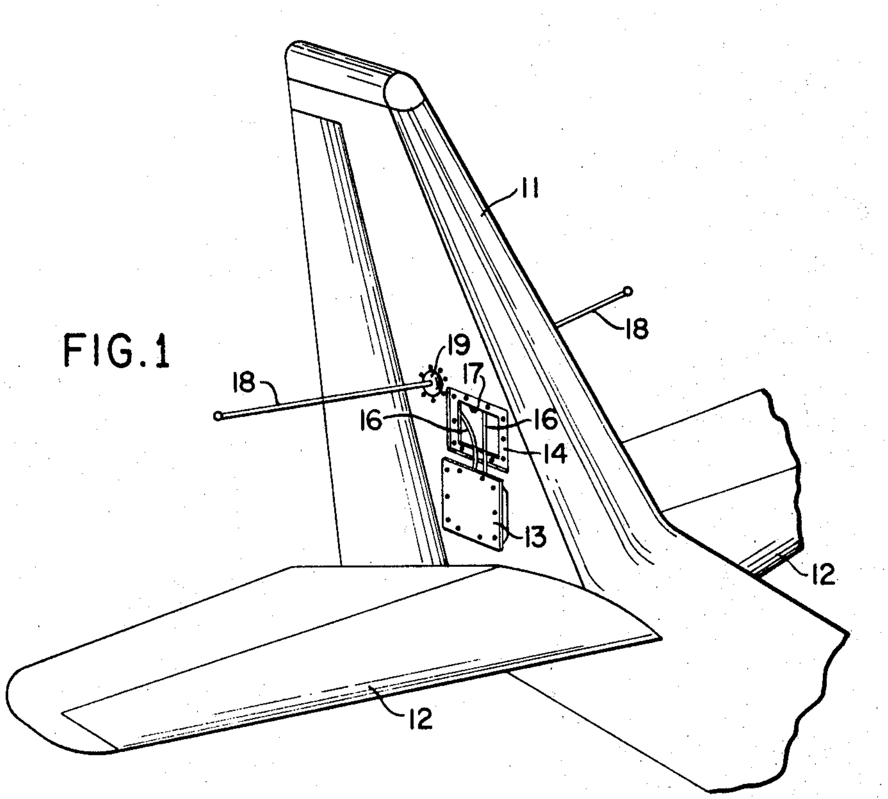
FIG. 1 is a pictorial representation of the tail section of an aircraft incorporating the invention.
Figure 2:
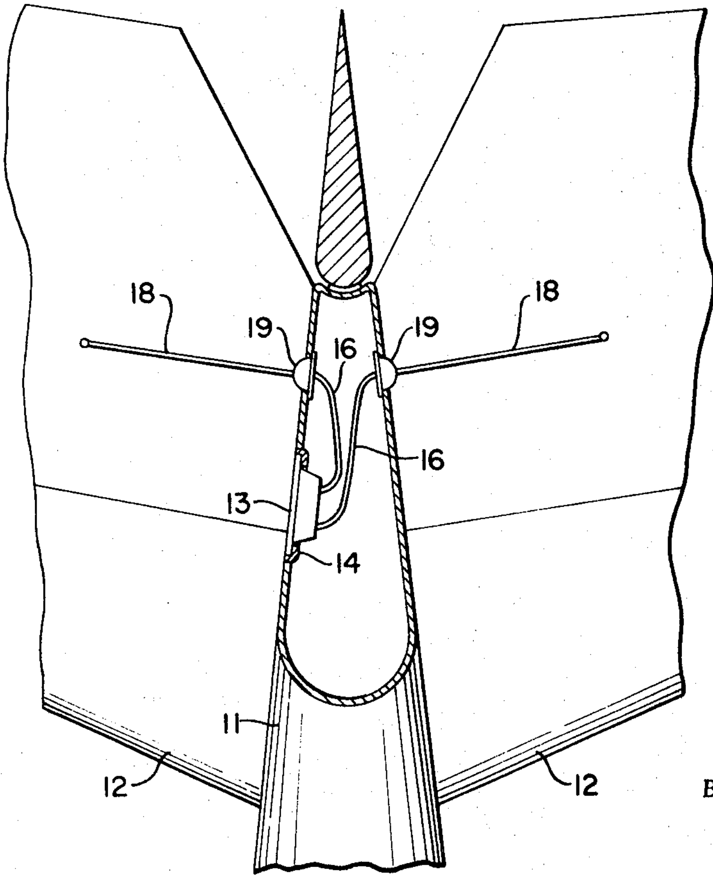
FIG. 2 is a horizontal section taken through the vertical stabilizer of the aircraft shown in FIG. 1.

Referring to the drawings and to FIG. 1 in particular, the pictorial view shows a typical tail section of, for example, a lightweight aircraft. The tail section has a vertical stabilizer 11 and an elevator 12 disposed on opposite sides thereof in a standard manner. On the vertical stabilizer would be mounted a box 13 which fits into a suitable mounting fixture 14 formed on the vertical stabilizer. Box 13 is shown detached therefrom to show two cables 16 extending through an opening 17 formed in the skin of the stabilizer 11. The cables 16 are each attached to respective antennas 18 as shown in FIG. 2. The antennas 18 are metallic rods protruding horizontally from the vertical stabilizer 11. In addition, fig. 2 shows the box 13 mounted to the fixture 14 by suitable means. Box 13 contains the electronic circuits and a power supply which produce the radio signals and are enclosed within a chamber typically 7.5 inches long, 6 inches wide and 2.5 inches thick. Cables 16 are, for example, coaxial cables which conduct the high frequency energy to the antennas 18. In this invention the rods 18 are disposed to extend through suitable insulators 19 mounted within openings in the metallic skin of the vertical stabilizer 11. The outer conductors of the cables are grounded to the skin of the aircraft while the center conductors are connected to the respective rods 18 as will be explained hereinafter. This invention teaches how to feed the rods 18 with high frequency energy so that the directions of the instantaneous currents flowing in each rod are the same. This allows the radiating fields to reinforce each other so that, at a given power production, signals may be audible a further distance over a relatively large solid angle. At the same time, the rods 18 are made to operate independently of each other, so that if one rod breaks the system can still radiate a significant fraction of the radio energy available.

Figures 3, 4:
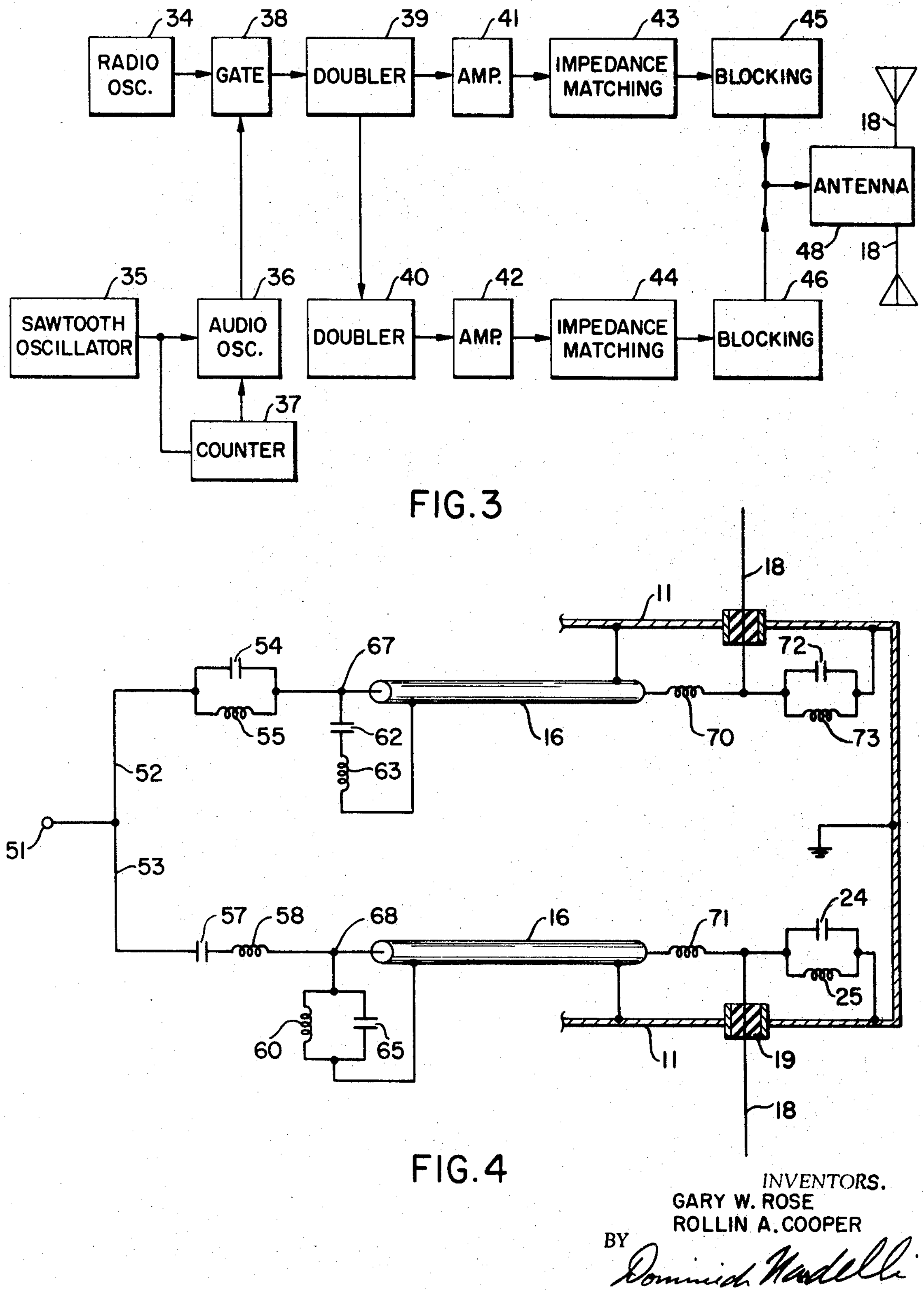
FIG. 3 is a block diagram of the preferred embodiment of the transmitter.
FIG. 4 is a schematic of the novel antenna circuit shown in FIG. 1.

Referring to FIG. 3, there is shown a block diagram of a circuit that performs this function. The circuit contains a radio oscillator 34 that produces alternating current at, for example, 60.75 megahertz (millions of cycles per second), and also contains a sawtooth oscillator 35 that produces a sawtooth wave or a ramp current that rises linearly with time to a peak value and then falls instantaneously to an initial value. The cycle of the sawtooth wave is preferably 2.5 cycles per second. The sawtooth wave from oscillator 35 is fed to an audio oscillator 36 and a counter 37. The audio oscillator 36 preferably outputs an alternating current which is 1600 cycles per second when the current from the sawtooth oscillator 35 is minimum and diminishes to 600 cycles per second when the current is maximum in inverse relation to the current in the sawtooth wave. The counter 37 counts the cycles outputted by the sawtooth oscillator and during 4 out of 6 cycles makes, in a standard manner, the audio oscillator 36 and, in turn, transmitter stages 39, 40, 41 and 42 inoperative so that battery power is saved during the time the audio oscillator 36 is off. Audio frequency from oscillator 36 is fed to a gate 38 wherein the audio signal modulates the higher frequency radio signal. In addition, gate 38 is constructed in a standard manner to prevent the radio signal from passing to a doubler circuit 39 whenever the audio oscillator 36 is made inoperative by the counter 37, as mentioned, to save battery power.

Doubler 39 doubles the frequency of the radio signal to 121.5 megahertz and feeds this signal to another doubler 40 and an amplifier 41. The doubler 40 is similar to doubler 39 in that it doubles the input radio signal frequency. Its output is then 243 megahertz, and it feeds this signal to amplifier 42. Both amplifiers 41 and 42 amplify the respective high frequency currents inputted therein and feed the amplified currents to impedance matching circuits 43 and 44, respectively, and then to blocking circuits 45 and 46. Blocking circuit 45 presents a high impedance to the 243 megahertz signal while blocking circuit 46 presents a high impedance to the 121.5 megahertz signal. Both radio signals from the blocking circuits are fed to a novel antenna circuit 48 which phase shifts the respective signals (in a manner to be explained) to cause the two independent antennas 18 to have the characteristics of a center-fed balanced dipole. The circuits 34 through 46 are standard circuits that are combined by the inventors to produce in a novel manner the required high frequency currents coupled to the antenna circuit 48.

Referring to FIG. 4, the novel antenna circuit 48 is schematically shown. Both radio signals, 121.5 and 243 megahertz signals, are coupled to terminal 51. The signals enter two branch leads 52 and 53. Lead 52 is connected to a lumped-constant inductor-capacitor network formed by a parallelly connected capacitor 54 and an inductance 55, while lead 53 is connected to a lumped-constant inductor-capacitor network formed by a serially connected capacitor 57 and inductance 58. The parallelly connected capacitor 54 and inductance 55 are connected to the center lead of one of the coaxial cables 16, and the inductance 58 is connected to the center lead of the other coaxial cable 16. The center lead of one of the cables 16 is grounded to the outer conductor through a serially connected capacitor 62 and inductance 63 while the center lead of the other cable is grounded through a parallelly connected capacitor 65 and inductance 60. The values of the capacitors 54 and 62 and the inductances 55 and 63 in the upper circuit of FIG. 4 can be calculated by one skilled in the art to provide a plus 90° phase shift at 121.5 megahertz and a minus 90° phase shift at 243 megahertz between the junctions 51 and 67. Similarly the values of the capacitors 57 and 65 and the inductances 58 and 60 in the lower circuit of FIG. 4 can be calculated to provide a minus 90° phase shift at 121.5 megahertz and a plus 90° phase shaft at 243 megahertz between the junctions 51 and 68. Thereby the respective signals are 180° out of phase at points 67 and 68 at both frequencies. Since the impedance of the coaxial cables 16 is, for example, 50 ohms, the impedances at junctions 67 and 68 are transformed by the passive element to $25+j25$ ohms and $25-j25$ ohms respectively, which combine in parallel to produce an impedance at terminal 51 of 25 ohms.

The coaxial cables 16 are made any convenient length but the lengths should be equal so as not to alter the phase relationship between the signals conducted by the respective cables. The signals are fed to the respective antenna rods 18 through inductances 70 and 71. As mentioned before, the rods 18 pass through and are insulated from the metallic skin of the vertical stabilizer 11, and the respective rods 18 are grounded to the metallic skin by a parallelly connected capacitor 72 and inductance 73 and by a parallelly connected capacitor 24 and inductance 25. Inductances 70 and 73 and capacitor 72 and inductances 71 and 25 and capacitor 24 form respective impedance matching networks to transform the complex impedance of the antenna rods 18 to a value of 50 ohms at both frequencies, thereby providing suitable impedance level for the connection of the coaxial cables 16.

The novel combination would include other features that are common in the art, for example, a switch (not shown) which closes contacts on impact and which is well known in the art. Then power would be supplied to the radio transmitter only after the plane has crash landed, thereby conserving power. Other modification of the invention will appear to those skilled in the art. Accordingly, the invention is not limited to the exact details of the illustrated preferred embodiment but includes all such modifications and variations coming within the scope of the invention as defined in the claims.

We claim:

1. In combination, a vehicle, a radio transmitter for simultaneously supplying two high frequency signals having different frequencies and being carried by said vehicle, and antenna means mounted on said vehicle;

said antenna means comprising a pair of rod elements disposed substantially colinearly and spaced from each other;

a grounded plane disposed between the adjacent ends of said rod elements, circuit means coupled between said radio transmitter and said antenna means for shifting said two high frequency signals 180° out of phase with each other and for coupling said shifted signals to a respective rod element so that current flows in both of said rod elements in the same direction;

said circuit means including first and second phase shift networks operably coupled to said radio transmitter and to one of said rod elements and responsive to said signals, said first network adapted to shift the phase of one of said signals and said second network adapted to shift the phase of the other of said signals; and third and fourth phase shift networks operably coupled to said radio transmitter and to the other of said rod elements and responsive to said signals, said third network adapted to shift the phase of one of said signals and said fourth network adapted to shift the phase of the other of said signals.

2. In the combination of claim 1 wherein; said vehicle is an aircraft having a vertical stabilizer, the rod elements are mounted on opposite sides of said vertical stabilizer.

3. In the combination of claim 1, wherein said first phase shift network includes a parallelly connected capacitor-inductance circuit operably coupled to said radio transmitter, and said second phase shift network includes a serially connected capacitor-inductance circuit operably coupled to said first phase shift network and to a respective rod element.

4. In the combination of claim 1, wherein said third phase shift network includes a serially connected capacitor-inductance circuit operably coupled to said radio transmitter, and said fourth phase shift network includes a parallelly connected capacitor-inductance circuit operably coupled to said third phase shift network and to a respective rod element.

5. In the combination of claim 1, wherein said circuit means additionally includes an input terminal connected to said radio transmitter to receive both of said signals from said radio transmitter, and first and second leads connected to said input terminal for conducting said signals to said phase shift networks, said first lead operably connected to said first phase shift network and said second lead operably connected to said third phase shift network.

6. In the combination of claim 1, wherein said circuit means additionally includes a first signal conducting means connected to said first and second phase shift networks for conducting said signals from said first and second phase shift networks, a second signal conducting means connected to said third and fourth phase shift networks for conducting signals from said third and fourth phase shift networks, a first impedance matching means operably coupled to said first signal conducting means and to a respective rod element for matching the complex impedance of said respective rod element, and a second impedance matching means operably coupled to said second signal conducting means and to a respective rod element for matching the complex impedance of said respective rod element.

7. In the combination of claim 6, wherein said first and second signal conducting means are coaxial cables.

8. In the combination of claim 6, wherein said first and second impedance matching means each includes an inductance operably connected with a parallelly connected capacitor-inductance network each operably coupled between a respective signal conducting means and a rod element.